United States Patent
Yanagawa et al.

(10) Patent No.: US 11,687,808 B2
(45) Date of Patent: Jun. 27, 2023

(54) ARTIFICIAL INTELLIGENCE EXPLAINING FOR NATURAL LANGUAGE PROCESSING

(71) Applicant: International Business Machines Corporation, Armonk, NY (US)

(72) Inventors: Takumi Yanagawa, Tokyo (JP); Fumihiko Terui, Edogawa-ku (JP); Kensuke Matsuoka, Funabashi (JP); Sayaka Furukawa, Nerima (JP)

(73) Assignee: International Business Machines Corporation, Armonk, NY (US)

(*) Notice: Subject to any disclaimer, the term of this patent is extended or adjusted under 35 U.S.C. 154(b) by 227 days.

(21) Appl. No.: 17/010,887

(22) Filed: Sep. 3, 2020

(65) Prior Publication Data
US 2022/0067558 A1    Mar. 3, 2022

(51) Int. Cl.
*G06N 5/045* (2023.01)
*G06F 40/56* (2020.01)
*G06N 20/00* (2019.01)
*G06F 40/268* (2020.01)

(52) U.S. Cl.
CPC ......... *G06N 5/045* (2013.01); *G06F 40/268* (2020.01); *G06F 40/56* (2020.01); *G06N 20/00* (2019.01)

(58) Field of Classification Search
CPC ...... G06N 5/045; G06N 20/00; G06F 40/268; G06F 40/56; G06F 40/16; G06F 40/253; G06F 40/284; G06F 40/289; G06F 40/30; G06F 40/55; G06F 40/216
See application file for complete search history.

(56) References Cited

U.S. PATENT DOCUMENTS

| | | | |
|---|---|---|---|
| 2007/0180356 A1* | 8/2007 | Sun | G06F 16/9535 707/E17.109 |
| 2015/0286627 A1 | 10/2015 | Chang | |
| 2016/0034457 A1* | 2/2016 | Bradley | G06F 16/24578 707/749 |
| 2020/0034482 A1 | 1/2020 | Masuda | |
| 2020/0372217 A1* | 11/2020 | Abuammar | G06N 3/0445 |
| 2021/0012897 A1* | 1/2021 | Katuwal | G06N 5/003 |
| 2021/0174200 A1* | 6/2021 | Huang | G06T 7/001 |

(Continued)

OTHER PUBLICATIONS

Baroni, Marco, and Silvia Bernardini. "A new approach to the study of translationese: Machine-learning the difference between original and translated text." Literary and Linguistic Computing 21.3 (2006): 259-274. (Year: 2006).*

(Continued)

*Primary Examiner* — Paras D Shah
*Assistant Examiner* — Paul J. Mueller
(74) *Attorney, Agent, or Firm* — Stephen R. Yoder

(57) ABSTRACT

In an approach to AI explaining for natural language processing, responsive to receiving an input text for a machine learning model, an output is generated from the machine learning model. A plurality of alteration techniques are applied to the input text to generate one or more alternate outputs, where each alternate output corresponds to an alteration technique. A variation rate of the alternate output is calculated for each alteration technique. A preferred technique of generating neighboring data of the input text is generated based on a comparison of the variation rate of the alternate output for each alteration technique.

17 Claims, 5 Drawing Sheets

(56) References Cited

U.S. PATENT DOCUMENTS

2021/0350004 A1* 11/2021 Rahnama-Moghaddam ............... G06F 16/2358
2021/0350273 A1* 11/2021 Huu ....................... G06N 3/084

OTHER PUBLICATIONS

Liu et al., "Towards Explainable NLP: A Generative Explanation Framework for Text Classification", Published by arXiv.org, arXiv:1811.00196v2, [cs.CL], Jun. 11, 2019, 12 Pages.
Ribeiro et al., "'Why Should I Trust You?' Explaining the Predictions of Any Classifier", Published by arXiv.org, arXiv:1602.04938v3, [cs.LG], Aug. 9, 2016, KDD 2016, San Francisco, CA, USA, 10 Pages.
Udeshi et al., "Grammar Based Directed Testing of Machine Learning Systems", Singapore University of Technology and Design, Published by arXiv.org, arXiv:1902.10027v3, [cs.LG], Nov. 6, 2019, 23 Pages.
Yang et al., "Hierarchical Attention Networks for Document Classification", Proceedings of NAACL-HLT 2016, Conference Paper, pp. 1480-1489, San Diego, California, Jun. 12-17, 2016, 11 Pages.
Yijing et al., "Imbalanced Text Sentiment Classification using Universal and Domain-Specific Knowledge", Knowledge-Based Systems, Science Direct, DOI: 10.1016/j.knosys.2018.06.019, Jun. 19, 2018, 34 Pages.

* cited by examiner

```
200

I          (start=0, part-of-speech=PRON)
like       (start=2, part-of-speech=VERB)
winter     (start=7, part-of-speech=NOUN)
more       (start=14, part-of-speech=ADJ)
than       (start=19, part-of-speech=ADP)
summer     (start=24, part-of-speech=NOUN)
.          (start=30, part-of-speech=PUNCT)
However    (start=32, part-of-speech=ADV)
,          (start=39, part-of-speech=PUNCT)
I          (start=41, part-of-speech=PRON)
am         (start=43, part-of-speech=AUX)
sensitive  (start=46, part-of-speech=ADJ)
to         (start=56, part-of-speech=ADP)
cold       (start=59, part-of-speech=ADJ)
.          (start=63, part-of-speech=PUNCT)
```

FIG. 2

ARTIFICIAL INTELLIGENCE EXPLAINING FOR NATURAL LANGUAGE PROCESSING

BACKGROUND

The present invention relates generally to the field of machine learning, and more particularly to artificial intelligence explaining for natural language processing.

Artificial intelligence (AI) can be defined as the theory and development of computer systems able to perform tasks that normally require human intelligence, such as speech recognition, visual perception, decision-making, and translation between languages. The term AI is often used to describe systems that mimic cognitive functions of the human mind, such as learning and problem solving.

Machine learning (ML) is an application of AI that creates systems that have the ability to automatically learn and improve from experience. Machine learning involves the development of computer programs that can access data and learn based on that data. Machine learning algorithms typically build mathematical models based on sample, or training, data in order to make predictions or decisions without being explicitly programmed to do so. Machine learning algorithms are used in a wide variety of applications, such as image analysis, speech recognition, classification, and medical applications.

Natural language processing (NLP) is a branch of artificial intelligence that helps computers understand, interpret, and manipulate human language. NLP is broadly defined as the automatic manipulation of natural language, like speech and text, by software. NLP draws from many disciplines, including computer science and computational linguistics, in its pursuit to give machines the ability to read, understand and derive meaning from human languages.

SUMMARY

Embodiments of the present invention disclose a method, a computer program product, and a system for AI explaining for natural language processing. In one embodiment, responsive to receiving an input text for a machine learning model, an output is generated from the machine learning model. A plurality of alteration techniques are applied to the input text to generate one or more alternate outputs, where each alternate output corresponds to an alteration technique. A variation rate of the alternate output is calculated for each alteration technique. A preferred technique of generating neighboring data of the input text is generated based on a comparison of the variation rate of the alternate output for each alteration technique.

BRIEF DESCRIPTION OF THE DRAWINGS

FIG. 2 depicts an example of the output of a morphological analysis, in accordance with an embodiment of the present invention.

DETAILED DESCRIPTION

One problem facing data scientists working with machine and deep learning algorithms built into automation and AI systems is that they lack transparency. Explainability is the extent to which the internal mechanics of a machine or deep learning system can be understood in human terms.

Model explainability is one of the most important problems in machine learning today. It is often the case that certain models such as deep neural networks are deployed to production and are running critical systems, and often not even the developers of these algorithms understand why exactly the algorithms make the decisions they make.

AI technology has become prevalent in many business applications. An AI algorithm is a black box and there is increasing pressure to be able to explain the rationale of its answer. An example of a method for explaining an AI includes the steps of generating a large number of pieces of neighboring data to the input data of the input/output data to be explained; recording output generated from the generated data; and building a known machine learning model that can explain the AI from the sets of input and output data obtained by this sampling.

When document classification or questions and answers are to be processed, it is very difficult to conduct sampling with sufficient accuracy. A conventional technique generates neighboring data by removing or substituting a word in an original data. In this case, the sentences "I like Winter more than Summer" and "I like Summer more than Winter" are close to each other for an AI that looks at words only, but they are opposite each other for an AI that looks at meaning. As a result, the conventional technique could explain the AI incorrectly. In addition, it is difficult to define a possible input space. Realistically, the computation cost for generating sentences for all the combinations of the words in a corpus is too high.

The present invention proposes a method for explaining an AI that processes natural language. The method investigates how the model to be explained interprets natural language sentences by using a linguistic method that takes into account text structures and grammar. Next this method dynamically changes the sampling method according to the result of the investigation. This way it is possible to generate input data that the model would regard as neighboring data. Thus, it is possible to restrain unnecessary sampling, and achieve an improvement in the accuracy. In some embodiments, the present invention creates a simplified model for explaining the machine learning model using the neighboring data generated by the invention.

Figure 1:
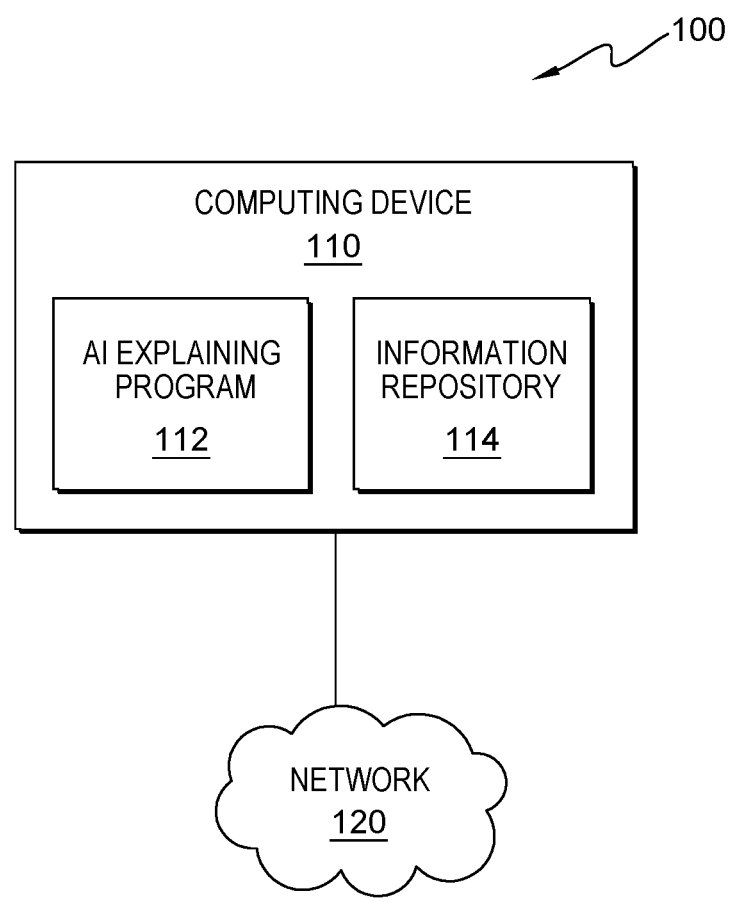
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of AI explaining program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, computing device 110 includes AI explaining program 112. In an embodiment, AI explaining program 112 is a program, application, or subprogram of a larger program for AI explaining for natural language processing. In an alternative embodiment, AI explaining program 112 may be located on any other device accessible by computing device 110 via network 120.

In an embodiment, computing device 110 includes information repository 114. In an embodiment, information repository 114 may be managed by AI explaining program 112. In an alternate embodiment, information repository 114 may be managed by the operating system of the device, alone, or together with, AI explaining program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, ML model data, ML input/output data, data for the NLP tasks (typically a dictionary of word or lexicon which are used for morphological analysis, word alteration, and generating neighboring data during AI explaining in our invention), neighboring data, learning data, user data, system configuration data, and other data that is received by AI explaining program 112 from one or more sources, and data that is created by AI explaining program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, the information repository 114 may be implemented with any suitable storage architecture known in the art, such as a relational database, an object-oriented database, or one or more tables.

FIG. 2 illustrates an example 200 of the output of a morphological analysis, in accordance with an embodiment of the present invention. In an embodiment, the full results of the morphological analysis for the example "I like winter more than summer. However, I am sensitive to cold." are illustrated in FIG. 2. For the example in FIG. 2, each token includes the fields for word position and part of speech. In NLP, a token is an individual occurrence of a linguistic unit in speech or writing. For example, if a sentence contains the word "the" three times, there is only one token for "the". The parts of speech in the results for this example are pronoun (PRON), verb (VERB), noun (NOUN), adjective (ADJ), adposition (ADP), punctuation (PUNCT), adverb (ADV), and auxiliary (AUX). In this example, the first token for the first word, "I", starts at position 0 (since it is the first character in the input text), and the part of speech is a pronoun. The use of the morphological analysis is explained in FIGS. 3a and 3b below.

Figure 3A:
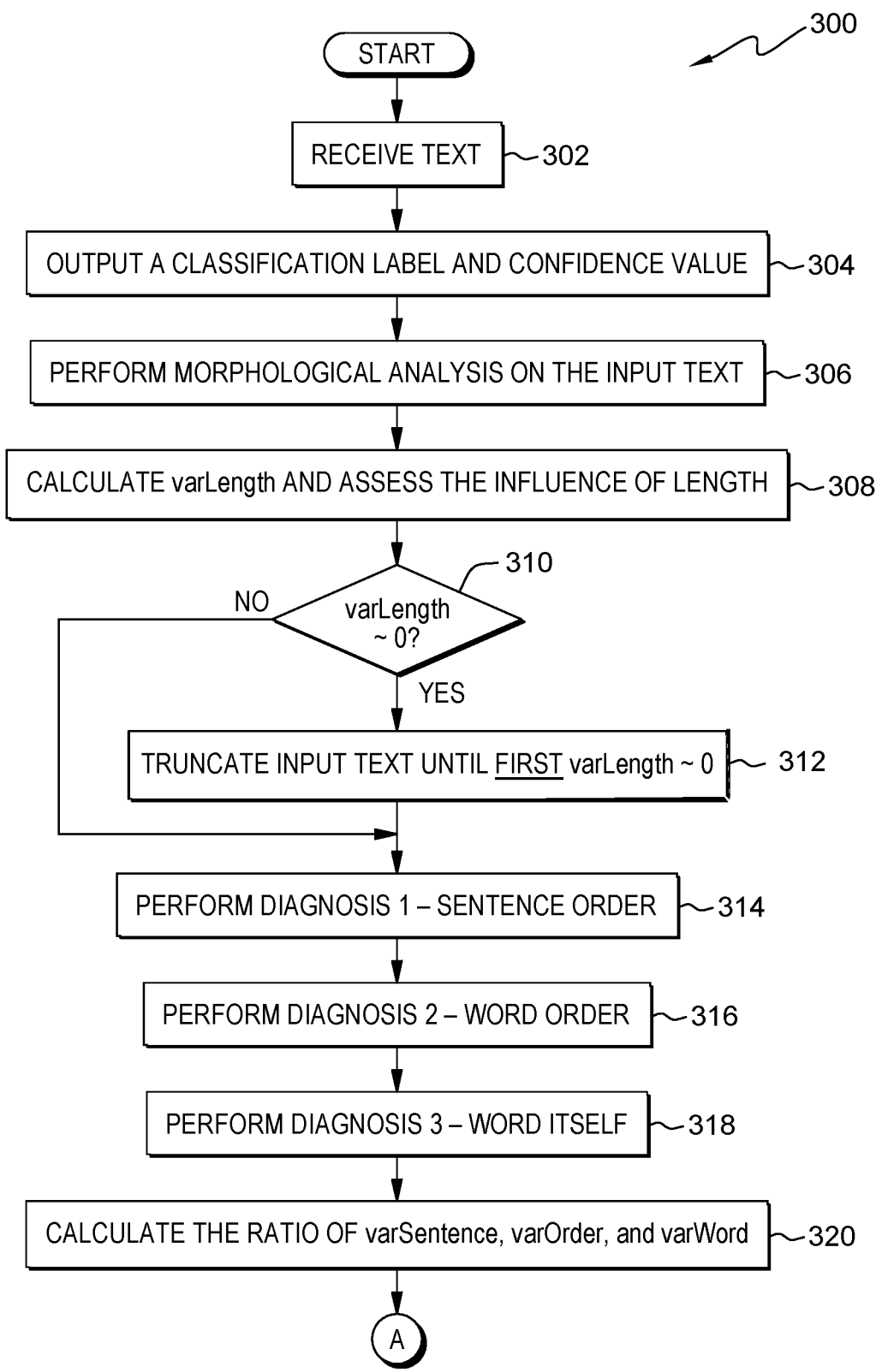
FIGS. 3a and 3b are a flowchart for the steps for the AI explaining program, within the distributed data processing environment of FIG. 1, in accordance with an embodiment of the present invention.
Figure 3B:
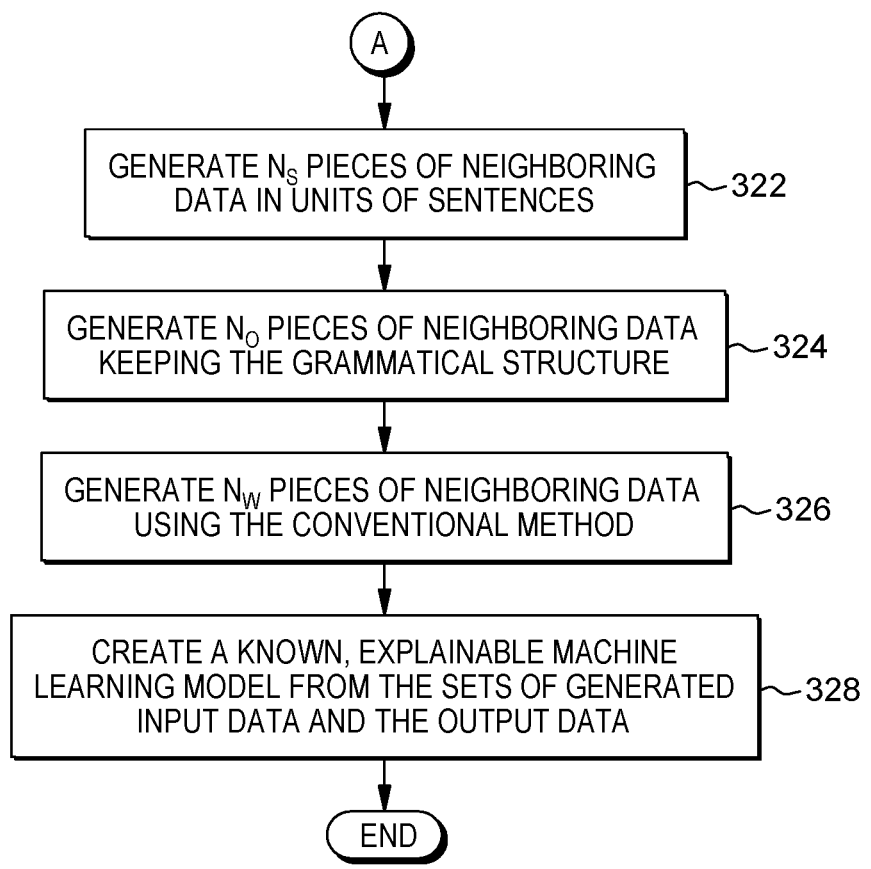

FIGS. 3a and 3b are a flowchart for the steps for the AI explaining program. In an alternative embodiment, the steps of workflow 300 may be performed by any other program while working with AI explaining program 112. In an embodiment, AI explaining program 112 receives an input text which is to be explained. In an embodiment, AI explaining program 112 saves the input text and the output of the AI analysis for the text which is to be explained. In an embodiment, AI explaining program 112 performs morphological analysis on the input text to convert it into a series of tokens. In an embodiment, AI explaining program 112 decomposes the text by a certain unit length into elements and repeats the steps of restoring the text sequentially with the decomposed elements one by one, inputting the restored text, and recording the length of the text and a variation amount of the output. In an embodiment, AI explaining program 112 determines if varLength~0. In an embodiment, AI explaining program 112 truncates the input to the point that varLength was first approximately zero, and inputs that value into the next phase of processing. In an embodiment, AI explaining program 112 determines the influence of exchanging sentences from the input text. In an embodiment, AI explaining program 112 determines the influence of the word order and grammar. In an embodiment, AI explaining program 112 determines the influence of a word itself. In an embodiment, AI explaining program 112 calculates the ratio of varSentence, varOrder, and varWord to determine the relative priority of Diagnosis 1-3. In an embodiment, AI explaining program 112 generates a number of pieces of neighboring data in units of sentences based on the ratio calculated earlier. In an embodiment, AI explaining program 112 generates a number of pieces of neighboring data keeping the grammatical structure based on the ratio calculated earlier. In an embodiment, if varWord>>varSentence and varOrder, then AI explaining program 112 uses the conventional method to generate a number of pieces of neighboring data which removes or substitutes words randomly. In an embodiment, AI explaining program 112 creates a known, explainable machine learning model from the sets of generated input data and the output data.

It should be appreciated that embodiments of the present invention provide at least for AI explaining for natural language processing. However, FIGS. 3a and 3b provide only an illustration of one implementation and do not imply any limitations with regard to the environments in which different embodiments may be implemented. Many modifications to the depicted environment may be made by those skilled in the art without departing from the scope of the invention as recited by the claims.

AI explaining program 112 receives text (step 302). In an embodiment, AI explaining program 112 receives an input text which is to be explained.

AI explaining program 112 outputs a classification label and a confidence value (step 304). In an embodiment, AI explaining program 112 saves the input text and the output of the AI analysis for the text which is to be explained. In an embodiment, if the text to be explained is a classification problem, then the output is a classification label and its confidence value. In an embodiment, if the text to be explained is a regression problem, then the output is the value of the input text itself. For example, an AI that estimates to what degree a user favors a season from a comment of the user would output the degree as a value.

AI explaining program 112 performs morphological analysis on the input text (step 306). In an embodiment, AI explaining program 112 performs morphological analysis on the input text to convert it into a series of tokens. Morphological analysis is a method for identifying, structuring, and investigating the total set of possible relationships contained in a given multidimensional problem complex. Morphological analysis in the context of NLP is the process of providing grammatical information about the word on the basis of properties of the morpheme it contains. For example, in case of an input "I like winter more than summer. However, I am sensitive to cold.", the resulting series of tokens is: | I | like | winter | more | than | summer |. | However |, | I | am | sensitive | to | cold |. |. In an embodiment, the full result after applying morphological analysis contains each token with properties like word position, part-of-speech, etc. In an embodiment, the full results of the morphological analysis for this example are illustrated in FIG. 2.

In an embodiment, AI explaining program 112 uses these properties for later calculations. For example, in step 316 below, the part-of-speech is used for substituting a function word with another function word (e.g., "summer" for "winter").

AI explaining program 112 calculates varLength and assesses the influence of length (step 308). In an embodiment, AI explaining program 112 decomposes the text by a certain unit length into elements and repeats the steps of restoring the text sequentially with the decomposed elements one by one, inputting the restored text, and recording the length of the text and a variation amount of the output. In an embodiment, AI explaining program 112 chooses the unit length by the type of analysis. For example, when performing sentence analysis, AI explaining program 112 chooses a sentence as the unit length. In the example illustrated in FIG. 2 above, in which the text contains two sentences, a first candidate text is constituted only by the first sentence "I like winter more than summer." and a second candidate text is "I like winter more than summer. However, I am sensitive to cold." which is the result of adding the second sentence to the first sentence.

In an embodiment, the unit length depends on the type of analysis used in AI explaining program 112. In the example above, the unit of analysis is a sentence. In another embodiment, AI explaining program 112 decomposes a text per word, so a word is the unit of analysis.

In an embodiment, AI explaining program 112 outputs the length of the text and a variation amount of the output in record named varLength. In an embodiment, the actual contents of varLength is a list of a set of the variation rate of the output and the sentence. For example, given the sentences of "I like winter more than summer. However, I am sensitive to cold. I wear a lot of clothes in winter. I like winter except the coldness. Winter has many events." and the output is whether you like winter or not with a confidence value. If the output of the original text is 0.7 (where the confidence is a value between 0 and 1; where 1 means you definitely like winter and 0 means you do not like winter at all.), AI explaining program 112 attempts to get the outputs when inputting the first sentence, the first 2 sentences, the first 3 sentences, so on. The variation rate of the output by the original output is defined by the equation variation rate=(the original output−the output of modified text)/(the original output).

For this example, assume the results are as illustrated below. In this example, the values shown are (input text, the output, the variation rate by the output of the original input).

For the first sentence, "I like winter more than summer.", the results are 1.0, 0.428 (the variation rate by the output of the original input, by the above formula, is 1.0 (the original output)−0.7 (the output of modified text)/0.7 (the original output), or (1.0−0.7)/0.7=0.428.

The results for the second sentence combination, "I like winter more than summer. However, I am sensitive to cold.", is 0.7, 0.0 (since (0.7−0.7)/0.7 is zero). The results for the third sentence combination, "I like winter more than summer. However, I am sensitive to cold. I wear a lot of clothes in winter.", is also 0.7, 0.0. The results for the fourth sentence combination, "I like winter more than summer. However, I am sensitive to cold. I wear a lot of clothes in winter. I like winter except the coldness.", is also 0.7, 0.0. The results for the fifth sentence combination, "I like winter more than summer. However, I am sensitive to cold. I wear a lot of clothes in winter. I like winter except the coldness. Winter has many events.", is also 0.7, 0.0.

So for this example, the input texts longer than the first 2 sentences are always have a varLength of zero. In this example, therefore, AI explaining program 112 considers that this model does not consume the input text longer than the first 2 sentences and AI explaining program 112 truncates the input texts that are longer than the first 2 sentences.

In an embodiment, if the calculation of varLength changes at a certain iteration, AI explaining program 112 will never truncate the text. For example, given the input texts and varLength calculations as follows: "I like winter more than summer.", 1.0, 0.428; "I like winter more than summer. However, I am sensitive to cold.", 0.7, 0.0; "I like winter more than summer. However, I am sensitive to cold. I wear a lot of clothes in winter.", 0.7, 0.0; "I like winter more than summer. However, I am sensitive to cold. I wear a lot of clothes in winter. I like winter except the coldness.", 0.7, 0.0; and "I like winter more than summer. However, I am sensitive to cold. I wear a lot of clothes in winter. I like winter except the coldness. Winter has many events.", 0.9, 0.285 (in this case, because the original output is 0.9, (0.9−0.7)/0.7=0.285); since the last iteration changes the output, AI explaining program 112 has to consider all the sentences, and does not truncate as in the first example.

AI explaining program 112 determines if varLength~0 (decision block 310). In an embodiment, AI explaining program 112 determines if varLength~0 based on system defaults. In another embodiment, AI explaining program 112 a user sets the values that AI explaining program 112 considers approximately zero. For example, in an embodiment, the user may set that varLength~0 if varLength<=0.1.

In an embodiment, if AI explaining program 112 determines that varLength is not approximately equal to zero ("no" branch, decision block 310), then AI explaining program 112 proceeds to step 314.

AI explaining program 112 truncates the input text until varLength~0 (step 312). In an embodiment, if AI explaining program 112 determines that varLength is approximately equal to zero ("yes" branch, decision block 310), then AI explaining program 112 truncates the input to the point that varLength was first approximately zero, and inputs that value into the next phase of processing in step 314. For the first example in decision block 310, AI explaining program 112 truncates the sentences after the first 2 sentences, i.e., "I like winter more than summer. However, I am sensitive to cold." AI explaining program 112 then performs a plurality of diagnoses against the truncated text. In an embodiment, each diagnoses is an alteration technique to generate an alternate output data from the input data. In an embodiment, AI explaining program 112 performs Diagnosis 1, 2, and 3 against this truncated text in steps 314, 316, and 318. In other embodiments, AI explaining program 112 may perform any number of diagnoses.

AI explaining program 112 performs Diagnosis 1—sentence order (step 314). In an embodiment, AI explaining program 112 determines the influence of exchanging sentences from the input text. For the example in FIG. 2, AI explaining program 112 constructs a text by exchanging the first and second sentences of the original text, inputs the constructed text, i.e., "However, I am sensitive to cold. I like winter more than summer.", to the AI analysis, and records in a record called varSentence the degree the confidence value varies.

In an embodiment, AI explaining program 112 calculates the degree the confidence for each diagnosis (step 314, step 316, and step 318) using the same equation as in step 308, variation rate=(the original output−the output of modified text)/(the original output).

For the example input text used earlier, "I like summer more than winter. However, I am sensitive to cold.", the output is whether you like winter or not with confidence. The input text is "I like summer more than winter. However, I am sensitive to cold." The output (equals the confidence of the prediction that the user likes winter) is 0.7. AI explaining program 112 inputs a text by changing the order of the sentences. For example, the new input is input "However, I am sensitive to cold. I like winter more than summer.", the output is 0.7 and the variation rate is 0.0 (=(0.7−0.7)/0.7). The record varSentence is therefore "However, I am sensitive to cold. I like winter more than summer.", 0.0.

AI explaining program 112 performs Diagnosis 2—word order (step 316). In an embodiment, AI explaining program 112 determines the influence of the word order and grammar. AI explaining program 112 constructs a text by changing the word order or substituting a function word with another function word in the original text and inputs the constructed text in a record called varOrder. When the text has a plurality of sentences, AI explaining program 112 performs the process on each sentence. In an embodiment, AI explaining program 112 maintains the grammatical structure of the input text while performing diagnosis 2.

For the above example, AI explaining program 112 exchanges the two words adjacent to "than" in the first sentence and inputs the resulted sentence "I like summer more than winter. However, I am sensitive to cold." to the AI analysis, and records a variation amount in the confidence value in varOrder. In a case in which only the second sentence is analyzed, the process inputs a sentence modified by substituting "However" with "Therefore" and records a variation amount in the confidence value in varOrder.

In an embodiment, AI explaining program 112 inputs a text by changing the word order and grammar. For the earlier example, the input is "I like summer more than winter. However, I am sensitive to cold.", the output is 0.7 and the variation rate is 0.0. For a second example, the input is "I like summer more than winter. Therefore, I am sensitive to cold.", the output is 0.7 and the variation rate is 0.0. In this example, varOrder is ("I like summer more than winter. However, I am sensitive to cold.", 0.0) and ("I like winter more than summer. Therefore, I am sensitive to cold.", 0.0).

AI explaining program 112 performs Diagnosis 3—word itself (step 318). In an embodiment, AI explaining program 112 determines the influence of a word itself. AI explaining program 112 modifies a sentence by removing a word from an original sentence or by substituting a word in the original sentence with another non-influential word and inputs the modified sentence in a record called varWord.

For the above example, AI explaining program 112 removes the word "like" to create a text "I winter more than summer. However, I am sensitive to cold." or substitutes the word with an unknown word "UNKWORDS" to create a text "I UNKWORDS Winter than Summer. However, I am sensitive to cold." and inputs the created text and records a variation amount in the confidence value in varWord.

In an embodiment, AI explaining program 112 inputs a text by replacing a word with "UNKWORDS". i.e., "unknown words". For the previous example, the new input is "I UNKWORDS winter more than summer. However, I am sensitive to cold.", the output is 0.5 and the variation rate is 0.285 ((0.7−0.5)/0.7). For another example, the new input is "I like UNKWORDS more than summer. However, I am sensitive to cold.", and the output is 0.1 and the variation rate is 0.557. and therefore varWord is ("I UNKWORDS winter more than summer. However, I am sensitive to cold.", 0.285) and ("I like UNKWORDS more than summer. However, I am sensitive to cold.", 0.557).

The format of the results of each diagnosis, varSentence, varOrder, and varWord, is an array of sets of modified sentences and the amount of variation of the output. AI explaining program 112 collects statistics of these results, e.g., an average in each diagnosis.

AI explaining program 112 calculates the ratio of varSentence, varOrder, and varWord (step 320). In an embodiment, AI explaining program 112 calculates the ratio of varSentence, varOrder, and varWord to determine the relative priority of Diagnosis 1-3.

AI explaining program 112 generates Ns pieces of neighboring data in units of sentences (step 322). In an embodiment, AI explaining program 112 generates a number of pieces of neighboring data in units of sentences based on the ratio calculated in Step 220.

If varSentence>>varOrder and VarWord, then generating neighboring data in units of sentences is prioritized. This is because exchanging sentences has a much larger influence on the result than word order or the words themselves, and therefore it is more efficient to give priority to generating data in units of sentences. Specifically, AI explaining program 112 generates a text by removing a certain sentence or by exchanging a pronoun or other part of speech that has an influence across sentences. For example, in the case of "I like winter more than summer. However, I am sensitive to cold. That is a pain point.", the process removes a sentence to create a text "I like winter more than summer. That is a pain point." or substitutes "That" with "The cold" to create a text "I like winter than summer. However, I am sensitive to cold. The cold is a pain point.".

AI explaining program 112 generates No pieces of neighboring data keeping the grammatical structure (step 324). In an embodiment, AI explaining program 112 generates a number of pieces of neighboring data keeping the grammatical structure based on the ratio calculated in Step 220.

If varOrder>>varSentence and varWord, then generating neighboring data keeping the grammatical structure is prioritized. The reason for this is that the word order and/or the grammatical structure in one sentence has a large influence on the result and therefore it is necessary to generate data keeping the grammatical structure in order to not to lose nearness. Specifically, the process exchanges a word with a different word with the same part of speech. For a word with a tense or a conjugation, AI explaining program 112 exchanges the word with another word with the same part of speech while keeping the tense or the form of the conjugation.

For example, in the case of "I like winter more than summer. However, I am sensitive to cold.", AI explaining program 112 exchanges "winter" with "autumn" to generate "I like autumn more than summer. However, I am sensitive to cold." or "I prefer winter to summer. However, I am sensitive to cold.".

AI explaining program 112 generates $N_W$ pieces of neighboring data using the conventional method (step 326). In an embodiment, if varWord>>varSentence and varOrder, then AI explaining program 112 uses the conventional method to generate a number of pieces of neighboring data which removes or substitutes words randomly. The conventional method generates neighboring data by removing or substituting a word in the input data. The reason AI explaining program 112 uses the conventional method in this case is that exchanging in units of sentences and difference in the word order in one sentence do not have an influence on the result and therefore it is more efficient to prioritize using the conventional method.

For example, in the case of "I like winter more than summer. However, I am sensitive to cold.", AI explaining program 112 generates "I UNKWORDS Winter than Summer. However, I am sensitive to cold." or "I like UNKWORDS than Summer. However, I UNKWORDS sensitive to cold.".

If varSentence~varOrder~varWord, AI explaining program 112 uses the above-described three methods evenly to generate neighboring data.

In an embodiment, AI explaining program 112 performs sampling based on the diagnosis results from Steps 314-318. The ratio of varSentence:varOrder:varWord calculated in Step 320 is used to determine the number of pieces of neighboring data to be generated for each diagnosis. In an embodiment, AI explaining program 112 analyzes the recorded values and changes the method of generating neighboring data accordingly.

For example, when varSentence=0.3, varOrder=2.1, and varWord=0.6, the ratio is 1:7:2. In this case, if generating 100 pieces of neighboring data, AI explaining program 112 generates 10 pieces of data in units of sentences, 70 pieces of data with keeping the grammatical structures, and 20 pieces of data by substituting or removing words randomly.

AI explaining program 112 creates a known, explainable machine learning model from the sets of generated input data and the output data (step 328). In an embodiment, AI explaining program 112 creates a known, explainable machine learning model from the sets of generated input data and the output data. In an embodiment, AI explaining program 112 creates a linear classifier. In other embodiments, AI explaining program 112 creates a multiple linear regression model, e.g., Ridge regression model, Lasso regression model; a multiple linear regression model with interaction; a Bilinear regression model; a Decision tree model; or a Naive Bayes model. These are often used as an interpretable model. In an embodiment, AI explaining program 112 may create any appropriate model as would be known to a person of skill in the art.

Figure 4:
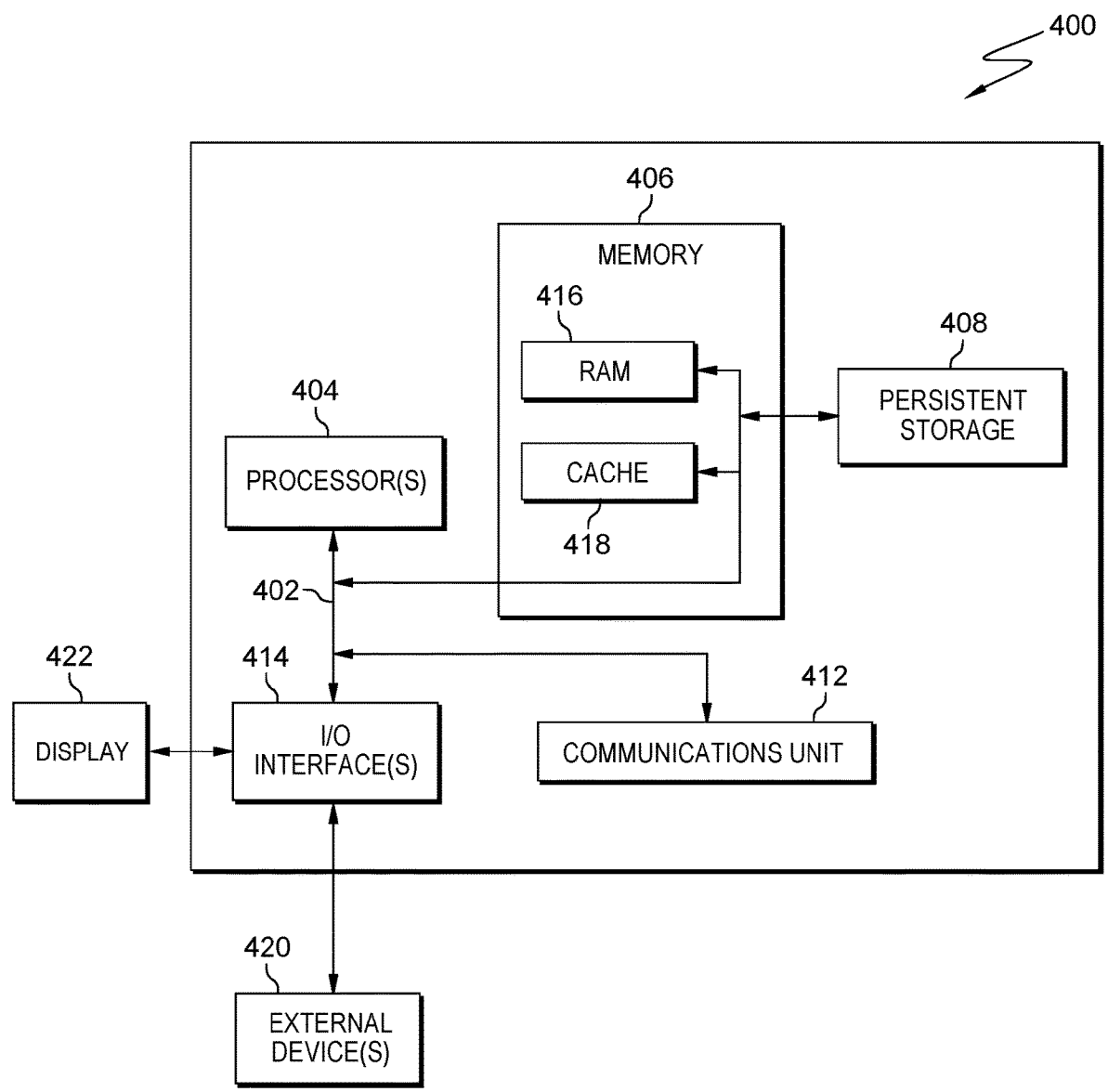
FIG. 4 depicts a block diagram of components of the computing devices executing the AI explaining program within the distributed data processing environment of FIG. 1, in accordance with an embodiment of the present invention.

FIG. 4 is a block diagram depicting components of computing device 110 suitable for AI explaining program 112, in accordance with at least one embodiment of the invention. FIG. 4 displays the computer 400, one or more processor(s) 404 (including one or more computer processors), a communications fabric 402, a memory 406 including, a random-access memory (RAM) 416, and a cache 418, a persistent storage 408, a communications unit 412, I/O interfaces 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/output (I/O) interface(s) 414. The communications fabric 402 may be implemented with an architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a RAM 416 and a cache 418. In general, the memory 406 can include any suitable volatile or non-volatile computer readable storage media. Cache 418 is a fast memory that enhances the performance of processor(s) 404 by holding recently accessed data, and near recently accessed data, from RAM 416.

Program instructions for AI explaining program 112 may be stored in the persistent storage 408, or more generally, any computer readable storage media, for execution by one or more of the respective computer processors 404 via one or more memories of the memory 406. The persistent storage 408 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

The communications unit 412, in these examples, provides for communications with other data processing systems or devices. In these examples, the communications unit 412 includes one or more network interface cards. The communications unit 412 may provide communications through the use of either or both physical and wireless communications links. In the context of some embodiments of the present invention, the source of the various input data may be physically remote to the computer 400 such that the input data may be received, and the output similarly transmitted via the communications unit 412.

The I/O interface(s) 414 allows for input and output of data with other devices that may be connected to computer 400. For example, the I/O interface(s) 414 may provide a connection to external device(s) 420 such as a keyboard, a keypad, a touch screen, a microphone, a digital camera, and/or some other suitable input device. External device(s) 420 can also include portable computer readable storage media such as, for example, thumb drives, portable optical or magnetic disks, and memory cards. Software and data used to practice embodiments of the present invention, e.g., AI explaining program 112, can be stored on such portable computer readable storage media and can be loaded onto persistent storage 408 via the I/O interface(s) 414. I/O interface(s) 414 also connect to a display 422.

Display 422 provides a mechanism to display data to a user and may be, for example, a computer monitor. Display 422 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for artificial intelligence explaining for natural language processing, the computer-implemented method comprising:
    responsive to receiving an input text for a machine learning model, generating, by one or more computer processors, an output from the machine learning model;
    applying, by the one or more computer processors, a plurality of alteration techniques to the input text to generate one or more alternate outputs, wherein each alternate output corresponds to an alteration technique of the plurality of alteration techniques;
    calculating, by the one or more computer processors, a plurality of variation rates of the alternate output for each respective alteration technique of the plurality of alteration techniques, wherein the plurality of variation rates represent a difference between the output and the alternate output divided by the output;
    selecting, by the one or more processors, a neighbor data generation technique based on a largest variation rate value of the plurality of variation rates; and
    generating, by the one or more computer processors, one or more neighboring data of the input text based on the selected neighbor data generation technique.

2. The computer-implemented method of claim 1, wherein applying the plurality of alteration techniques to the input text to generate the one or more alternate outputs, wherein each alternate output corresponds to the alteration technique of the plurality of alteration techniques comprises:
    applying, by the one or more computer processors, a sentence alteration technique to the input text, wherein the sentence alteration technique exchanges an order of one or more sentences constituting the text;
    applying, by the one or more computer processors, a grammar alteration technique to the input text, wherein the grammar alteration technique exchanges an order of one or more words constituting the text, wherein the grammar alteration technique changes a grammar of the text; and
    applying, by the one or more computer processors, a word alteration technique to the input text, wherein the word alteration technique includes at least one of removing a word included in the input text and substituting the word included in the input text.

3. The computer-implemented method of claim 1, wherein generating the one or more neighboring data of the input text based on the comparison of the plurality of variation rates of the alternate output for each alteration technique of the plurality of alteration techniques comprises:
    applying, by the one or more computer processors, the plurality of alteration techniques to the input data, wherein the plurality of alteration techniques further comprises:
        a first alteration technique that generates the one or more neighboring data by modifying the input text in units of sentences;
        a second alteration technique that generates the one or more neighboring data by modifying the input text, wherein modifying the input text maintains a grammatical structure of the input text;
        a third alteration technique that generates the one or more neighboring data by modifying the input text in units of words; and
    responsive to determining a ratio of the plurality of variation rates of one or more outputs of the plurality of alteration techniques, generating, by the one or more computer processors, a plurality of pieces of neighboring data, wherein the plurality of pieces of neighboring data contains the one or more neighboring data from each alteration technique based on the ratio of the plurality of variation rates.

4. The computer-implemented method of claim 1, wherein responsive to receiving the input text for the machine learning model, generating the output from the machine learning model further comprises performing, by the one or more computer processors, a morphological analysis on the input text to convert the input text into a series of tokens.

5. The computer-implemented method of claim 1, wherein the machine learning model uses a classification problem, and the output from the machine learning model is a classification label and a confidence value.

6. The computer-implemented method of claim 1, wherein the machine learning model uses a regression model, and the output from the machine learning model is a value of the regression.

7. A computer program product for artificial intelligence explaining for natural language processing, the computer program product comprising one or more computer readable storage media and program instructions stored on the one or more computer readable storage media, the program instructions including instructions to:
responsive to receiving an input text for a machine learning model, generate an output from the machine learning model;
apply a plurality of alteration techniques to the input text to generate one or more alternate outputs, wherein each alternate output corresponds to an alteration technique of the plurality of alteration techniques;
calculate a plurality of variation rates of the alternate output for each respective alteration technique of the plurality of alteration techniques, wherein the plurality of variation rates represent a difference between the output and the alternate output divided by the output;
select a neighbor data generation technique based on a largest variation rate value of the plurality of variation rates; and
generate one or more neighboring data of the input text based on the selected neighbor data generation technique.

8. The computer program product of claim 7, wherein apply the plurality of alteration techniques to the input text to generate the one or more alternate outputs, wherein each alternate output corresponds to the alteration technique of the plurality of alteration techniques comprises one or more of the following program instructions, stored on the one or more computer readable storage media, to:
apply a sentence alteration technique to the input text, wherein the sentence alteration technique exchanges an order of one or more sentences constituting the text;
apply a grammar alteration technique to the input text, wherein the grammar alteration technique exchanges an order of one or more words constituting the text, wherein the grammar alteration technique changes a grammar of the text; and
apply a word alteration technique to the input text, wherein the word alteration technique includes at least one of removing a word included in the input text and substituting the word included in the input text.

9. The computer program product of claim 7, wherein generate the one or more neighboring data of the input text based on the comparison of the plurality of variation rates of the alternate output for each alteration technique of the plurality of alteration techniques comprises one or more of the following program instructions, stored on the one or more computer readable storage media, to:
apply the plurality of alteration techniques to the input data, wherein the plurality of alteration techniques further comprises:
a first alteration technique that generates the one or more neighboring data by modifying the input text in units of sentences;
a second alteration technique that generates the one or more neighboring data by modifying the input text, wherein modifying the input text maintains a grammatical structure of the input text;
a third alteration technique that generates the one or more neighboring data by modifying the input text in units of words; and
responsive to determining a ratio of the plurality of variation rates of one or more outputs of the plurality of alteration techniques, generate a plurality of pieces of neighboring data, wherein the plurality of pieces of neighboring data contains the one or more neighboring data from each alteration technique based on the ratio of the plurality of variation rates.

10. The computer program product of claim 7, wherein responsive to receiving the input text for the machine learning model, generating the output from the machine learning model further comprises performing, by the one or more computer processors, a morphological analysis on the input text to convert the input into a series of tokens.

11. The computer program product of claim 7, wherein the machine learning model uses a classification problem, and the output from the machine learning model is a classification label and a confidence value.

12. The computer program product of claim 7, wherein the machine learning model uses a regression model, and the output from the machine learning model is a value of the regression.

13. A computer system for artificial intelligence explaining for natural language processing, the computer system comprising:
one or more computer processors;
one or more computer readable storage media; and
program instructions stored on the one or more computer readable storage media for execution by at least one of the one or more computer processors, the stored program instructions including instructions to:
responsive to receiving an input text for a machine learning model, generate an output from the machine learning model;
apply a plurality of alteration techniques to the input text to generate one or more alternate outputs, wherein each alternate output corresponds to an alteration technique of the plurality of alteration techniques;
calculate a plurality of variation rates of the alternate output for each respective alteration technique of the plurality of alteration techniques, wherein the plurality of variation rates represent a difference between the output and the alternate output divided by the output;
select a neighbor data generation technique based on a largest variation rate value of the plurality of variation rates; and
generate one or more neighboring data of the input text based on the selected neighbor data generation technique.

14. The computer system of claim 13, wherein apply the plurality of alteration techniques to the input text to generate the one or more alternate outputs, wherein each alternate output corresponds to the alteration technique of the plurality of alteration techniques comprises one or more of the following program instructions, stored on the one or more computer readable storage media, to:
apply a sentence alteration technique to the input text, wherein the sentence alteration technique exchanges an order of one or more sentences constituting the text;
apply a grammar alteration technique to the input text, wherein the grammar alteration technique exchanges an order of one or more words constituting the text, wherein the grammar alteration technique changes a grammar of the text; and
apply a word alteration technique to the input text, wherein the word alteration technique includes at least one of removing a word included in the input text and substituting the word included in the input text.

15. The computer system of claim 13, wherein generate the one or more neighboring data of the input text based on the comparison of the plurality of variation rates of the alternate output for each alteration technique of the plurality of alteration techniques comprises one or more of the following program instructions, stored on the one or more computer readable storage media, to:

apply the plurality of alteration techniques to the input data, wherein the plurality of alteration techniques further comprises:
- a first alteration technique that generates the one or more neighboring data by modifying the input text in units of sentences;
- a second alteration technique that generates the one or more neighboring data by modifying the input text, wherein modifying the input text maintains a grammatical structure of the input text;
- a third alteration technique that generates the one or more neighboring data by modifying the input text in units of words; and responsive to determining a ratio of the plurality of variation rates of one or more outputs of the plurality of alteration techniques, generate a plurality of pieces of neighboring data, wherein the plurality of pieces of neighboring data contains the one or more neighboring data from each alteration technique based on the ratio of the plurality of variation rates.

16. The computer system of claim 13, wherein responsive to receiving the input text for the machine learning model, generating the output from the machine learning model further comprises performing, by the one or more computer processors, a morphological analysis on the input text to convert the input into a series of tokens.

17. The computer system of claim 13, wherein the machine learning model uses a classification problem, and the output from the machine learning model is a classification label and a confidence value.

* * * * *